United States Patent
Tock et al.

(10) Patent No.: US 11,381,665 B2
(45) Date of Patent: Jul. 5, 2022

(54) TRACKING CLIENT SESSIONS IN PUBLISH AND SUBSCRIBE SYSTEMS USING A SHARED REPOSITORY

(71) Applicant: International Business Machines Corporation, Armonk, NY (US)

(72) Inventors: Yoav Tock, Haifa (IL); Nir Naaman, Haifa (IL); Avraham Harpaz, Haifa (IL)

(73) Assignee: International Business Machines Corporation, Armonk, NY (US)

(*) Notice: Subject to any disclaimer, the term of this patent is extended or adjusted under 35 U.S.C. 154(b) by 98 days.

(21) Appl. No.: 16/278,183

(22) Filed: Feb. 18, 2019

(65) Prior Publication Data

US 2020/0267230 A1    Aug. 20, 2020

(51) Int. Cl.
    *H04L 67/55*     (2022.01)
    *H04L 67/146*    (2022.01)
    *G06F 16/953*    (2019.01)
    *H04L 41/16*     (2022.01)
    *H04L 67/01*     (2022.01)
    *H04L 67/143*    (2022.01)

(52) U.S. Cl.
    CPC ............ *H04L 67/55* (2022.05); *G06F 16/953* (2019.01); *H04L 41/16* (2013.01); *H04L 67/01* (2022.05); *H04L 67/143* (2013.01); *H04L 67/146* (2013.01)

(58) Field of Classification Search
    CPC ....... H04L 67/26; H04L 41/16; H04L 67/143; H04L 67/42; H04L 67/146; G06F 16/953
    USPC .......................................................... 707/749
    See application file for complete search history.

(56) References Cited

U.S. PATENT DOCUMENTS

| | | | |
|---|---|---|---|
| 8,706,865 B1* | 4/2014 | L'Heureux | H04L 67/101 709/224 |
| 8,787,393 B2 | 7/2014 | Jakubik et al. | |
| 8,874,667 B2 | 10/2014 | Edwards et al. | |
| 9,269,080 B2 | 2/2016 | Miller et al. | |
| 9,465,880 B2 | 10/2016 | Gray-Donald et al. | |
| 9,491,134 B2* | 11/2016 | Rosen | H04M 1/72547 |
| 9,552,493 B2* | 1/2017 | Uzun | H04L 63/10 |
| 9,584,449 B2 | 2/2017 | Fletcher et al. | |
| 9,654,571 B2 | 5/2017 | Horton | |
| 9,912,676 B1* | 3/2018 | Fieldman | G09B 5/065 |
| 9,912,695 B1* | 3/2018 | Chao | H04L 63/1425 |

(Continued)

OTHER PUBLICATIONS

Amozarrain, Ugaitz et al., Reliable Publish/Subscribe in Dynamic Systems, Mar. 15, 2016, pp. 10.

(Continued)

*Primary Examiner* — Hosain T Alam
*Assistant Examiner* — Nicholas E Allen
(74) *Attorney, Agent, or Firm* — Barry D. Blount

(57) ABSTRACT

Examples of techniques for tracking client sessions in a publish and subscribe system using a shared repository are described herein. An example system includes a processor of a server to receive a connection request with a client identifier from a client a predefined policy for duplicate client sessions. The processor is to query a shared repository of the system using the client identifier. The processor is to also execute a set of actions based on the predefined policy, a query result including a detected duplicate client session from the shared repository, and a set of parameters.

20 Claims, 7 Drawing Sheets

300

(56) References Cited

U.S. PATENT DOCUMENTS

| | | | |
|---|---|---|---|
| 9,996,561 B1 | 6/2018 | Bareness et al. | |
| 10,021,245 B1* | 7/2018 | Koster | H04M 3/5133 |
| 10,691,501 B1 | 6/2020 | Hussain et al. | |
| 2003/0163693 A1 | 8/2003 | Medvinsky | |
| 2005/0246186 A1* | 11/2005 | Nikolov | G06Q 10/107 |
| | | | 709/206 |
| 2006/0080287 A1 | 4/2006 | Majd et al. | |
| 2006/0224744 A1 | 10/2006 | Rao et al. | |
| 2006/0248038 A1 | 11/2006 | Kaplan et al. | |
| 2007/0192326 A1 | 8/2007 | Angal et al. | |
| 2007/0276943 A1 | 11/2007 | Marez et al. | |
| 2008/0133454 A1 | 6/2008 | Markl et al. | |
| 2009/0125420 A1 | 5/2009 | Zhang | |
| 2009/0171705 A1* | 7/2009 | Bobak | G06Q 50/188 |
| | | | 705/80 |
| 2009/0319498 A1 | 12/2009 | Zabokritski et al. | |
| 2010/0070639 A1 | 3/2010 | Hoggan | |
| 2010/0333111 A1* | 12/2010 | Kothamasu | H04L 51/14 |
| | | | 719/313 |
| 2012/0023558 A1* | 1/2012 | Rafiq | H04L 63/205 |
| | | | 726/6 |
| 2013/0013688 A1* | 1/2013 | Wang | H04L 63/104 |
| | | | 709/204 |
| 2013/0262931 A1* | 10/2013 | Siddalingesh | G06F 11/3672 |
| | | | 714/28 |
| 2015/0207857 A1* | 7/2015 | Horton | H04L 67/16 |
| | | | 709/204 |
| 2015/0280959 A1* | 10/2015 | Vincent | H04L 67/1097 |
| | | | 709/203 |
| 2015/0296242 A1* | 10/2015 | Khalil | H04N 21/26283 |
| | | | 725/25 |
| 2016/0019279 A1 | 1/2016 | Sengupta et al. | |
| 2016/0173423 A1 | 6/2016 | Cullen | |
| 2016/0227471 A1* | 8/2016 | De Foy | H04L 12/4633 |
| 2017/0118218 A1* | 4/2017 | Koottayi | H04L 63/101 |
| 2017/0155691 A1* | 6/2017 | Knauft | H04L 67/1097 |
| 2017/0331791 A1* | 11/2017 | Wardell | H04W 12/0602 |
| 2018/0027006 A1* | 1/2018 | Zimmermann | H04L 63/0245 |
| | | | 726/11 |
| 2018/0083835 A1* | 3/2018 | Cole | H04L 41/12 |
| 2018/0131516 A1* | 5/2018 | Meng | H04L 9/0643 |
| 2018/0254892 A1* | 9/2018 | Egorov | H04L 9/0819 |
| 2018/0321356 A1* | 11/2018 | Kulkarni | G06Q 10/087 |
| 2019/0235910 A1 | 8/2019 | Valentine et al. | |
| 2019/0235919 A1 | 8/2019 | Barsness et al. | |

OTHER PUBLICATIONS

Barazzutti, Raphael, et al., Elastic Scaling of a High-Throughput Content-Based Published/Subscribe Engine, The research leading to these results has received funding from the European Community's Seventh Framework Programme (FP7/2007-2013) under grant agreement No. 257843 (SRT-15 project), Year: 2014, pp. 10, Abstract only available.

Salvador, Zigor, et al., Phoenix: a Protocol for Seamless Client Mobility in Publish/Subscribe, 2012 IEEE 11th International Symposium on Network Computing and Application, Sep. 13, 2012, p. 1.

List of IBM Patents or Applications Treated as Related.

* cited by examiner

100

TRACKING CLIENT SESSIONS IN PUBLISH AND SUBSCRIBE SYSTEMS USING A SHARED REPOSITORY

BACKGROUND

The present techniques relate to publish and subscribe systems. More specifically, the techniques relate to modifying databases of publish and subscribe systems.

SUMMARY

According to an embodiment described herein, a system can include processor of a server to receive a connection request with a client identifier from a client and a predefined policy for duplicate client sessions. The processor can also further query a shared repository of the system using the client identifier. The processor can also execute a set of actions based on the predefined policy, a query result including a detected duplicate client session from the shared repository, and a set of parameters.

According to another embodiment described herein, a method can include receiving, via a processor of a server, a connection request with a client identifier from a client and a predefined policy for duplicate client sessions. The method can further include querying, via the processor, a shared repository of a system using the client identifier. The method can also further include executing, via the processor, a set of actions based on the predefined policy, a query result including a detected duplicate client session from the shared repository, and a set of parameters.

According to another embodiment described herein, a computer program product for tracking clients in a publish and subscribe system can include computer-readable storage medium having program code embodied therewith. The computer readable storage medium is not a transitory signal per se. The program code executable by a processor to cause the processor to receive a connection request with a client identifier from a client and a predefined policy for duplicate client sessions. The program code can also cause the processor to query a shared repository of the publish and subscribe system using the client identifier. The program code can also cause the processor to track client sessions based on the predefined policy, a query result including a detected duplicate client session from the shared repository, and a set of parameters.

DETAILED DESCRIPTION

Figure 1:
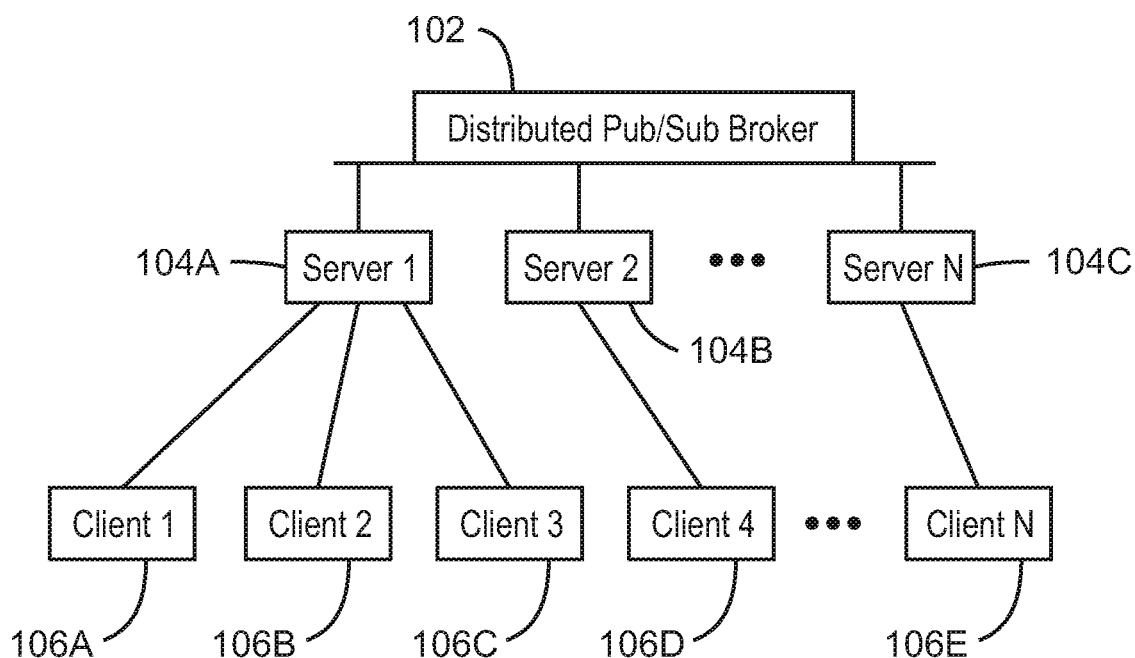
FIG. 1 is a block diagram of an example system for tracking client sessions in publishing and subscribing using a shared repository.

Publish and subscribe (pub/sub) systems are a communication paradigms that allow users that produce and consume messages to interact in a decoupled fashion. One example of a pub/sub system is a topic-based pub/sub system. In a topic-based pub/sub system, message producers, referred to as publishers, publish their messages on logical channels called "topics". Message consumers, referred to as subscribers, subscribe to the topics that are of interest to them, and receive messages published on those topics of choice. Publishers and subscribers are thus decoupled because they do not need to know of one another, but rather the topic names with which they communicate. An example pub/sub architecture is that of a single centralized broker to which multiple clients connect. Each client can be a publisher, a subscriber, or both. The broker is responsible for routing the messages published by the publishers to the subscribers according to the pub/sub protocol the messaging system implements. However, a single centralized broker may not be sufficient to support large pub/sub messaging systems with many clients and high throughput.

Therefore, a group, or a cluster, of multiple servers may be used to collectively implement a distributed broker. However, detecting duplicate client sessions in a distributed broker may be difficult. In the case of a pub/sub system implemented with a single centralized broker detecting duplicate client sessions is straightforward. The single broker holds the information about all the connected clients and when a new connect request from a client arrives the broker can check whether a connection from a client with the same ClientID already exist. If an existing client is already using the same ClientID the broker has control over both connections and can therefore easily implement any duplicate resolution policy. The task is much more challenging in the case of a distributed broker where clients connect to different servers. In this case, when a new connect request from a client arrives to a server, the server checks that a client with the same ClientID is not connected to any of the other servers. Since clients operate independently, clients with duplicate ClientID may attempt to connect at different timing including multiple clients attempting to connect at the same time. The problem is complicated further by the fact that servers may fail at any given time. For example, a server may fail due to a hardware problem. When a server fails, the clients that were connected to this server may be disconnected and may attempt to reconnect before the other servers become aware that the server has failed. In such cases, the reconnecting clients may falsely appear as duplicate client sessions to the other servers.

According to embodiments of the present disclosure, a system can include a processor of a server to receive a connection request with a client identifier from a client and a predefined policy for duplicate client sessions. For example, the predefined policy may be a duplicate-client-session policy that defines actions to perform in response to detecting various types of duplicate client sessions. The processor is to query a shared repository of the system using the client identifier. The processor is to further execute a set of actions based on the predefined policy, a query result including a detected duplicate client session from the shared repository, and a set of parameters. In some examples, the set of parameters can include a property of the client, a history of connection attempts by the client or other clients, a history of resolutions of previously detected duplicate client sessions, a status of a plurality of servers of the system, among other parameters. Thus, the techniques described herein allow client sessions to be tracked in publish and subscribe systems having a distributed broker including a number of servers and a shared repository. Moreover, the techniques described herein do not use centralized arbitration and thus do not impose any restrictions on the way clients are routed to servers. The techniques described herein involve minimal direct interaction between the different servers and decisions are made locally by each server. The techniques described herein can also support a wide range of duplicate client session resolution policies including dynamic policies that may change over time.

In some scenarios, the techniques described herein may be implemented in a cloud computing environment. As discussed in more detail below in reference to at least FIGS. 4-7, a computing device configured to track client sessions in a publish and subscribe system using a shared repository may be implemented in a cloud computing environment. It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

With reference now to FIG. 1, a block diagram shows an example system for tracking client sessions in publishing and subscribing using a shared repository. The example system 100 includes a distributed publish and subscribe (pub/sub) broker 102. The distributed pub/sub broker 102 is communicatively coupled to a number of servers, including server 104A, server 104B, and server 104C. In various examples, the servers 104A-104C are computing devices that receive, store, and transmit data between the clients 106A-106E. As one example, the system 100 also includes client 106A, client 106B, and client 106C communicatively coupled to server 104A. The system includes client 106D communicatively coupled to server 104B. The system includes client 106E communicatively coupled to server 104C.

In the example of FIG. 1, a group, or a cluster, of multiple servers including servers 104A-104C collectively forms a distributed pub/sub broker 102. Clients 106A-106E can connect to one of the servers and thus the load on each server is reduced by distributing the workloads provide by the clients 106A-106E. Although three servers 104A-104C are shown in the example of FIG. 1, additional servers may be used. In some examples, by adding more servers, the capacity of the system 100, in terms of the number of clients that can connect and the overall message throughput, is increased. In various examples, the distributed pub/sub broker 102 appears to the clients 106A-106E as a single large centralized pub/sub broker to which all the clients 106A-106E are connected.

Still referring to FIG. 1, a distributed pub/sub broker 102 of system 100 is implemented by a set of decoupled servers 104A, 104B, and 104C. To keep the implementation simple and scalable the servers 104A, 104B, and 104C may have minimal direct interaction with one another and a new client connection is routed, by a load balancer, to one of the servers 104A, 104B, or 104C. For example, the new client connection may be routed to the least loaded server of the server 104A, 104B, or 104C. In some examples, any other load balancing scheme may be used to route new client connections.

One aspect of pub/sub messaging concerns the detection and possibly prevention of duplicate client sessions. In some examples, each client has a unique client identifier (ClientID) and the pub/sub broker 102 must not have more than one client connected with the same ClientID. For example, the Pub/sub system 100 may be used to implement the MQTT protocol. The MQTT specification, version 3.1 released on Aug. 19, 2010, states that if a client attempts to connect to the broker and another client is already connected with the same ClientID, the currently connected client is to be disconnected. Only after an old client is disconnected, the new client is connected. By disconnecting the old client, the system 100 is able to remove clients which become unresponsive and thus cannot be easily disconnected. In various examples, predefined policies for handling duplicate client sessions may be received and used. The policies can define, for example, that both the old and new clients be disconnected, one client be disconnected (old or new), or that both clients will be allowed to connect. The preferred action may depend on several factors such as the type of the client or the recent history of duplicate client sessions. In some examples, the policy is for the new client to be allowed to connect, whereas the old client is immediately or eventually disconnected. Thus, as one example, if a client with ClientID X connects to the broker while another client with ClientID X is already connected to the broker, the pub/sub system 100 detects the duplication and proceeds according to a predefined duplicate-client-session policy. For example, to comply with the specifications of the MQTT protocol the client that connected first must be disconnected and only then the new client may connect. In another example, an administrator may set a policy that does not delay the connection of the new client for more than five seconds even at the risk of temporarily creating a duplicate client session. In various examples, the tracking of client connections can be performed using a central repository or database, as discussed with respect to FIG. 2 below.

It is to be understood that the block diagram of FIG. 1 is not intended to indicate that the system 100 is to include all of the components shown in FIG. 1. Rather, the system 100 can include fewer or additional components not illustrated in FIG. 1 (e.g., additional client devices, or additional resource servers, etc.).

Figure 2:
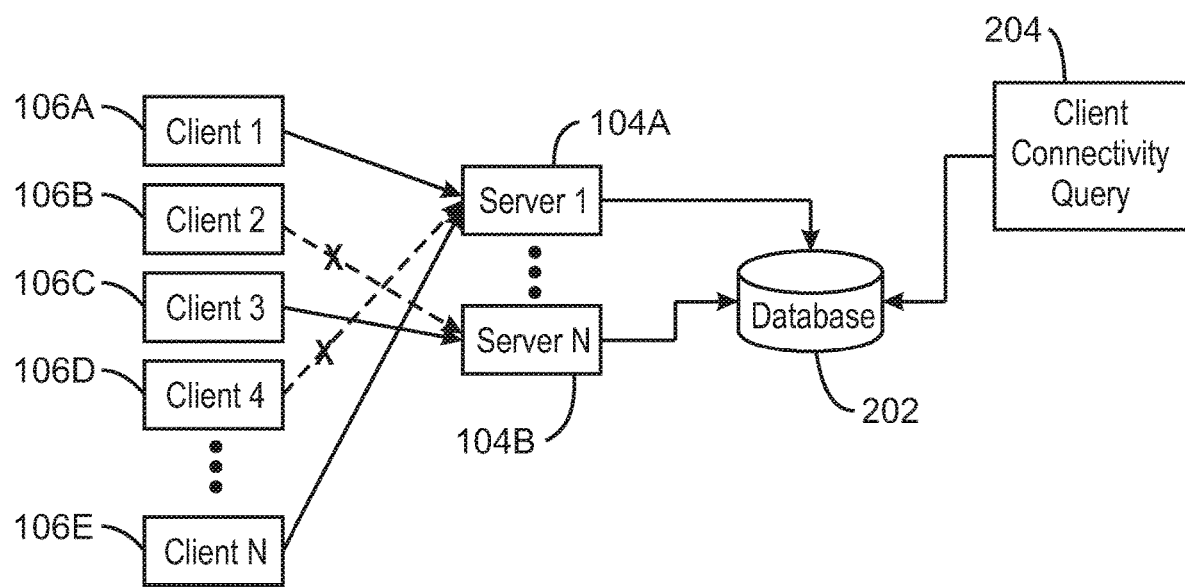
FIG. 2 is a block diagram of another example system for tracking client sessions in publishing and subscribing using a shared repository.

With reference now to FIG. 2, a block diagram shows an example system for tracking client sessions in publishing and subscribing using a shared repository. The example system 200 of FIG. 2 includes a set of clients 106A-106E. The system also includes servers 104A and 104B. The clients 106A and 106E are communicatively coupled to server 104A. The client 106C is communicatively coupled to server 104B. The client 106B was communicatively coupled to server 104B, but is now disconnected as indicated by dotted line and an X. Similarly, client 106D was communicatively coupled to server 104A, but is now disconnected as indicated by dotted line and an X. The system 100 further includes a database 202 communicatively coupled to server 104A and server 104B. The database 202 is shown receiving a client connectivity query 204.

In the example of FIG. 2, the connectivity of clients 106A-106E is tracked in the database 202. For example, the database 202 may be a central repository. Each server updates the repository whenever a client connects or disconnects. In various examples, the connectivity information may be used for multiple purposes such as monitoring clients, troubleshooting, sending messages to connected clients, or to clients with certain properties, among other purposes.

Still referring to FIG. 2, the central repository can be implemented using a database 202 such as MongoDB, MySQL, or any other suitable database 202. In various examples, the servers 104A and 104B maintain tables or collections in the database. In some examples, the tables may include a SERVER_STATUS table used to track the status of the different servers 104A and 104B. For example, each row (or record/document) in the table has the following fields (columns): ServerID, StatusCode, and LastUpdate. The ServerID column may be used to store unique identifiers of each server. The StatusCode column may store the current status of each server. For example, the status of a server may be ACTIVE, SUSPENDED, or DOWN. In various examples, the tables may include a CLIENT_STATUS table. The CLIENT_STATUS table records the connectivity status of a client. As one example, each row in the CLIENT_STATUS table has the following fields: ClientID, ConnectStatus, ConnectingServer, and LastUpdate. The ClientID field may be used to store unique identifiers for each client. The ConnectStatus field may be used to store the current status of each client. For example, the status of each client may be CONNECTED or DISCONNECTED. The ConnectingServer field may be used to store the ServerID of the server to which each of the clients is currently connected. The LastUpdate field may be used to store a logical timestamp of the last update to this row.

In various examples, each of the servers 104A and 104B updates the CLIENT_STATUS table after a new client 106A-106E, such as clients 106A, 106C or 106E, is connected to the server or after an existing client disconnects from the server, such as in the case of clients 106B and 106D. In some examples, each such update includes the ClientID of the connecting or disconnecting client, the ServerID of the server as ConnectingServer, the ConnectStatus, and the current time as the LastUpdate field. Whenever a server updates one of the tables, the server ensures that the operations of reading from the database and writing to the database are atomic. This ensures that the server's view of the table is consistent with the actual table's content in the database at the time the update is performed. In various examples, this is done using conditional updates on the LastUpdate field. For example, a conditional update can include reading, modifying, and writing. In some examples, in reading, a server reads the row and records the LastUpdate field. In modifying, the server modifies the row-record in the server's memory based on the read content. The server then modifies the LastUpdate field to a newer timestamp. In writing, the server updates the row in the table, conditioned that the current LastUpdate field is equal to the one obtained in the read step. If the update fails, the sequence of read-modify-write is repeated. For example, the update may fail because the condition is not satisfied.

In various examples, the servers 104A and 104B use the SERVER_STATUS table in the database to detect which server is currently active and which server is down. For example, when a server is started, the server can generate a new unique ServerID for itself and update the SERVER_STATUS table with a new row including its ServerID, a StatusCode of ACTIVE and LastUpdate equal to the current time. While the server is active, the server periodically updates its LastUpdate timestamp. For example, the server may update the LastUpdate stamp every second. When a server is shut down, the server changes its StatusCode to DOWN before shutting down. In various examples, each server also periodically checks the LastUpdate timestamp of all other servers. In some examples, if a server detects a timestamp that was not updated in more than a configured timeout it changes the StatusCode of the corresponding server to SUSPENDED. For example, the configured timeout may be 20 seconds. The server then updates all the rows in the CLIENT_STATUS table in which the ConnectingServer is equal to the ServerID of the suspended server, to reflect the fact that the clients are disconnected. In some examples, if a server attempts to update its last update time and detects that its status code has changed to suspended, the server shuts itself down in response to detecting the suspended status code. Thus, the servers can detect when a server fails or becomes non-responsive and remove clients which were previously connected to this server. For example, the clients may have been disconnected when the server failed.

As one example, when a server with ServerID=sid gets a request for a new connection from a client with ClientID=cid, the server first checks whether this may be a duplicate client session. If a risk for a duplicate client session is detected, the server handles the situation based on the duplicate-client-session policy that the administrator defined, as discussed herein. For example, the server can read from the CLIENT_STATUS table the record with ClientID=cid. In various examples, there can be three different scenarios that the server handles based on the result of the read operation.

In a first scenario, the read may indicate no client session duplication. For example, if the read for ClientID=cid does not return a record or if the read returns a record but the record's ConnectStatus=DISCONNECTED, this means that this is not a duplicate client session. In this case, the CLIENT_STATUS table is updated with a new record that has ClientID=cid, ConnectStatus=CONNECTED, ConnectingServer=sid, and LastUpdate=current_time. If the database update is successful, the server completes the process of connecting the client.

In a second scenario, the server detects a duplicate client session within the server. For example, if the read operation from the CLIENT_STATUS table returns a record with ClientID=cid and ConnectStatus=CONNECTED and ConnectingServer=sid, this may indicate that there is a risk for a duplicate client session, but that the duplication can be resolved locally within the same server. In this case, the server finds the connection to the client with ClientID-cid and resolves the duplication based on the duplicate-client-session policy. The server then updates the CLIENT_STATUS table based on the action that was taken. For example, if the server is implementing the MQTT protocol, the existing client is disconnected and then the new client is connected. The record in the CLIENT_STATUS table is updated with a new LastUpdate timestamp.

In a third scenario, the server detects a duplicate client session within a different server. For example, if the read operation from the CLIENT_STATUS table returns a record with ClientID=cid and ConnectStatus=CONNECTED and ConnectingServer=sid_1, sid_1 being different than sid, this means that there is a risk for a duplicate client session for a client that is connected to a different server. In some examples, this can be a result of a failure of the server with ServerID=sid_1 that caused all clients connected to it to disconnect but without updating the CLIENT_STATUS table. The server thus reads from the SERVER_STATUS table the record with ServerID=sid_1. If a record does not exist or the record exists but with a StatusCode equal to SUSPENDED or DOWN, this may mean that the server with sid_1 is not active and thus the server performs the steps of the first scenario to connect the client and update the client status table. The server may also check the LastUpdate timestamp in the record of sid_1 and see if its StatusCode can be changed to SUSPENDED. In some examples, if, based on the SERVER_STATUS table, the server with ServerID=sid_1 appears to be ACTIVE, this may mean that there is a risk for a duplicate client session and again the server attempts to resolve the potential duplication based on the duplicate-client-session policy. In such cases, the duplicate-client-session policy may define one of any number of predetermined actions.

In various examples, the actions defined in the policy may include the following three actions: a first action to connect the client immediately, a second action to connect the client after an attempt to resolve the duplication, and a third action to disconnect the client if the duplication has not been resolved. In some examples, the first action of connecting the client immediately includes ignoring the potential duplication, updating the CLIENT_STATUS table, and connecting the client.

In various examples, the second action to connect the client after an attempt to resolve the duplication includes sending a request to the server with ServerID=sid_1 to disconnect the client with ClientID=cid. In some examples, the then server selects a timeout, or maximal time to wait, T, and starts to periodically read the database until one of the following events are detected: the CLIENT_STATUS table no longer has a record for a client with ClientID=cid or that the record for such a client has ConnectStatus=DISCONNECTED, the SERVER_STATUS table no longer has a record for a server with ServerID=sid_1 or that the record for such a server has a StatusCode equal to SUSPENDED or DOWN, or the timeout T expires. Once one of these events are detected, the server performs the actions of the scenario in which no client session duplication is detected to connect the client. In various examples, the timeout T can be dynamically selected based on different parameters such as configuration, the connecting client information in the repository, history of client connect requests and client disconnect events, or any other relevant information.

In various examples, the third action to disconnect the client if the duplication has not been resolved may be similar to the option described earlier but if the timeout T expires, then the server fails the connect attempt from the client. In some examples, different timeouts can be used for these different actions. For example, the timeout used when a client is disconnected if the timeout expires may be longer than the timeout used if the client is connected after the timeout expires.

The decision of the server on which of these three actions to take can be static or dynamic and can be based on different parameters. For example, the decision may depend on the properties of the connecting client, the history of connect attempts made by this client or other clients, the history of the resolution of previous client session duplicates, the status of the servers composing the distributed broker, or other relevant parameters. In one example, a machine-learning model can be used to determine the recommended action to take and the parameters to use. For example, the machine-learning model can be used to determine the length of the timeout. In various examples, the machine learning model is periodically retrained based on the information gathered by the servers. As one example, the server can take the third action in the first 10 potential duplication with sid_1 but after that take the second action. For example, the large number of potential duplicates may indicate that sid_1 may actually be down and clients are not actually connected to it.

It is to be understood that the block diagram of FIG. 2 is not intended to indicate that the system 200 is to include all of the components shown in FIG. 2. Rather, the system 200 can include fewer or additional components not illustrated in FIG. 2 (e.g., additional client devices, or additional resource servers, etc.).

Figure 3:
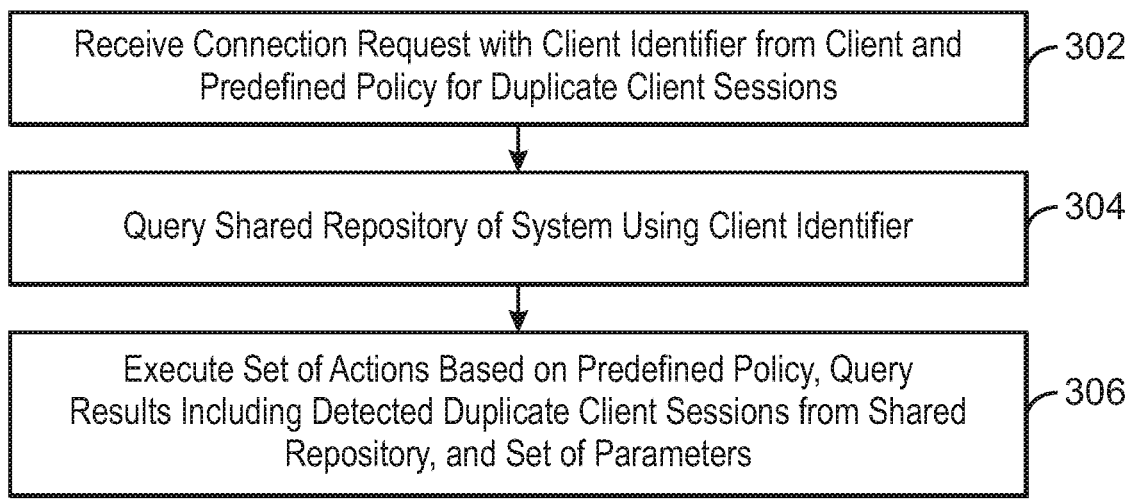
FIG. 3 is a block diagram of an example method that can track client sessions in publishing and subscribing using a shared repository.

FIG. 3 is a process flow diagram of an example method that can track client sessions in publishing and subscribing using a shared repository. The method 300 can be implemented with any suitable computing device, such as the computing device 400 of FIG. 4 and the systems 100 and 200 of FIGS. 1 and 2. In some examples, the method 300 can be implemented using the computer-readable medium 700 of FIG. 7.

At block 302, a connection request with a client identifier from a client, a predefined policy for duplicate client sessions are received. For example, the predefined policy may be a duplicate-client-session policy that defines actions taken in response to various types of detected duplicate client sessions. In various examples, the parameter includes a property of the client, a history of connection attempts by the client or other clients, a history of resolutions of previously detected duplicate client sessions, or a status of a plurality of servers of the system.

At block 304, a shared repository of the system is queried using the client identifier. For example, the share repository may be a database. In some examples, the database includes a client status table and a server status table.

At block 306, a set of actions are executed based on the predefined policy, query results including detected duplicate client sessions from the shared repository, and a set of parameters. In various examples, the parameters can include a property of the client, a history of connection attempts by the client or other clients, a history of resolutions of previously detected duplicate client sessions, a status of a plurality of servers of the system, or any combination thereof.

In some examples, the client is connected and a client status table is updated with the client identifier in response to detecting that the query result does not indicate any duplicate client session. In various examples, in response to detecting that the query result indicates a duplicate client session within the server, the duplicate client session is resolved locally and the client status table is updated based on the action taken to resolve the duplicate client. In some examples, in response to detecting that the query result indicates a duplicate client session within a second server, a record corresponding to a server ID of a second server in a server status table is read and the detected duplicate client session is resolved. For example, the client is connected and a client status table is updated with the client identifier in response to detecting no record in the server status table or that the record indicates a suspended or down status. In various examples, the duplicate client session is ignored, a client status table is updated, and the client is connected in response to detecting the record indicates an active status. In some examples, a request is sent to the second server to disconnect the client, a timeout is selected, and the client status table and the server status table are periodically read, in response to detecting the record indicates an active status. In these examples, the client is connected in response to detecting that the client status table no longer has a record for the client ID or a connect status of disconnected, the server status table does not have a record corresponding to the server ID or contains a status of suspended or down, or that the timeout has expired. In various examples, a request is sent to the second server to disconnect the client, a timeout is selected, and the client status table and the server status table are periodically read, in response to detecting the record indicates an active status. In these examples, the client is connected in response to detecting that the client status table no longer has a record for the client ID or a connect status of disconnected, or that the server status table does not have a record corresponding to the server ID or contains a status of suspended or down, the processor to fail the connection request in response to detecting that the timeout has expired.

The process flow diagram of FIG. 3 is not intended to indicate that the operations of the method 300 are to be executed in any particular order, or that all of the operations of the method 300 are to be included in every case. Additionally, the method 300 can include any suitable number of additional operations. For example, the method 300 can also include training a machine learning mechanism to perform the actions of block 306. In some examples, the machine learning mechanism may be a neural network, a decision tree, or a decision forest. The machine learning mechanism can be trained using the predefined policy and the set of parameters. In some examples, the machine learning mechanism can be trained in real-time based on detected duplicate client sessions.

Figure 4:
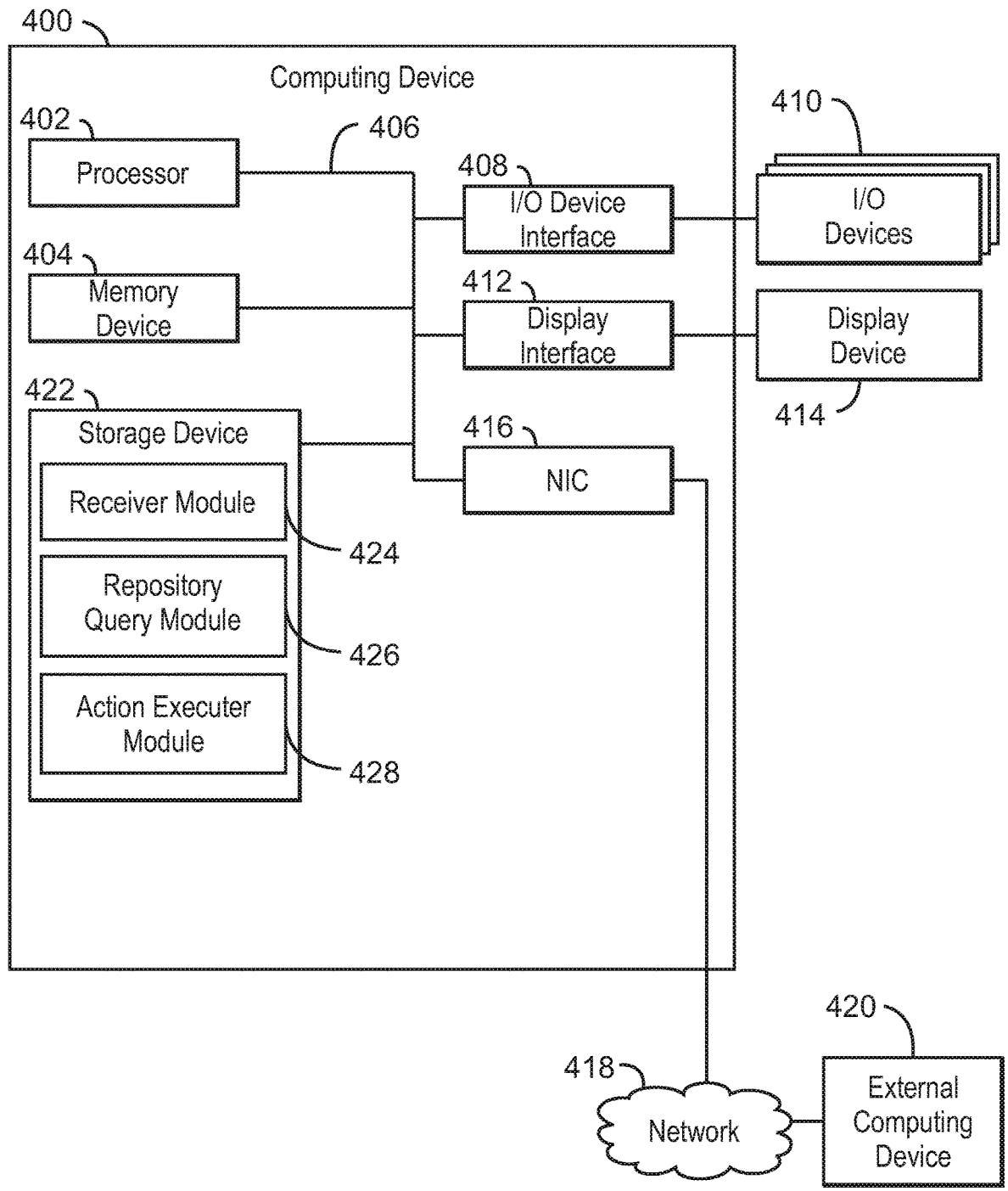
FIG. 4 is a block diagram of an example computing device that can track client sessions in publishing and subscribing using a shared repository.

FIG. 4 is block diagram of an example computing device that can track client sessions in publishing and subscribing using a shared repository. The computing device 400 may be for example, a server, desktop computer, laptop computer, tablet computer, or smartphone. In some examples, computing device 400 may be a cloud computing node. In various examples, the computing device 400 is a server of a number of servers forming a distributed broker of a publish and subscribe system. Computing device 400 may be described in the general context of computer system executable instructions, such as program modules, being executed by a computer system. Generally, program modules may include routines, programs, objects, components, logic, data structures, and so on that perform particular tasks or implement particular abstract data types. Computing device 400 may be practiced in distributed cloud computing environments where tasks are performed by remote processing devices that are linked through a communications network. In a distributed cloud computing environment, program modules may be located in both local and remote computer system storage media including memory storage devices.

The computing device 400 may include a processor 402 that is to execute stored instructions, a memory device 404 to provide temporary memory space for operations of said instructions during operation. The processor can be a single-core processor, multi-core processor, computing cluster, or any number of other configurations. The memory 404 can include random access memory (RAM), read only memory, flash memory, or any other suitable memory systems.

The processor 402 may be connected through a system interconnect 406 (e.g., PCI®, PCI-Express®, etc.) to an input/output (I/O) device interface 408 adapted to connect the computing device 400 to one or more I/O devices 410. The I/O devices 410 may include, for example, a keyboard and a pointing device, wherein the pointing device may include a touchpad or a touchscreen, among others. The I/O devices 410 may be built-in components of the computing device 400, or may be devices that are externally connected to the computing device 400.

The processor 402 may also be linked through the system interconnect 406 to a display interface 412 adapted to connect the computing device 400 to a display device 414. The display device 414 may include a display screen that is a built-in component of the computing device 400. The display device 414 may also include a computer monitor, television, or projector, among others, that is externally connected to the computing device 400. In addition, a network interface controller (NIC) 416 may be adapted to connect the computing device 400 through the system interconnect 406 to the network 418. In some embodiments, the NIC 416 can transmit data using any suitable interface or protocol, such as the internet small computer system interface, among others. The network 418 may be a cellular network, a radio network, a wide area network (WAN), a local area network (LAN), or the Internet, among others. An external computing device 420 may connect to the computing device 400 through the network 418. In some examples, external computing device 420 may be an external web-server 420. In some examples, external computing device 420 may be a cloud computing node.

The processor 402 may also be linked through the system interconnect 406 to a storage device 422 that can include a hard drive, an optical drive, a USB flash drive, an array of drives, or any combinations thereof. In some examples, the storage device may include a receiver module 424, a repository query module 426, and an action executer module 428. The receiver module 424 can receive a connection request with a client identifier from a client and a predefined policy for duplicate client sessions. For example, the predefined policy may be a duplicate-client-session policy that defines actions to take in response to detecting a duplicate client session. The repository query module 426 can query a shared repository of the system using the client identifier. The action executer module 428 can execute a set of actions based on the predefined policy, a query result including a detected duplicate client session from the shared repository, and a set of parameters. The set of parameters can include a property of the client, a history of connection attempts by the client or other clients, a history of resolutions of previously detected duplicate client sessions, a status of a plurality of servers of the system, or any combination thereof. For example, the action executer module 428 can connect the client and update a client status table with the client identifier the query result does not indicate any duplicate client session. In various examples, the action executer module 428 can resolve the duplicate client session locally and update the client status table based on the action taken to resolve the duplicate client. For example, the action executer module 428 can resolve the duplicate client session locally in response to detecting that the query result indicates a duplicate client session within the server. In some examples, the action executer module 428 can, in response to detecting that the query result indicates a duplicate client session within a second server, read a record corresponding to a server ID of the second server in a server status table and resolve the detected duplicate client session. For example, the action executer module 428 can connect the client and update a client status table with the client identifier in response to detecting no record in the server status table or that the record indicates a suspended or down status. In various examples, the action executer module 428 can ignore the duplicate client session, update a client status table, and connect the client in response to detecting the record indicates an active status. In some examples, the action executer module 428 can send a request to the second server to disconnect the client, select a timeout, and periodically read the client status table and the server status table, in response to detecting the record indicates an active status. In this example, the action executer module 428 can connect the client in response to detecting that the client status table no longer has a record for the client ID or a connect status of disconnected, the server status table does not have a record corresponding to the server ID or contains a status of suspended or down, or that the timeout has expired. In some examples, the action executer module 428 can, in response to detecting the record indicates an active status, send a request to the second server to disconnect the client, selecting a timeout and periodically read the client status table and the server status table. In these examples, the action executer module 428 can connect the client in response to detecting that the client status table no longer has a record for the client ID or a connect status of disconnected, or that the server status table does not have a record corresponding to the server ID or contains a status of suspended or down. The action executer module 428 can also fail the connection request in response to detecting that the timeout has expired. For example, the timeout may expire before the action executer module 428 detects that the client status table no longer has a record for the client ID or a connect status of disconnected, or that the server status table does not have a record corresponding to the server ID or contains a status of suspended or down. In some examples, the action executer module 428 can also dynamically select the timeout based on a configuration, information corresponding to the client in the repository, a history of client connect requests and client disconnect events, or any combination thereof.

It is to be understood that the block diagram of FIG. 4 is not intended to indicate that the computing device 400 is to include all of the components shown in FIG. 4. Rather, the computing device 400 can include fewer or additional components not illustrated in FIG. 4 (e.g., additional memory components, embedded controllers, modules, additional network interfaces, etc.). Furthermore, any of the functionalities of the receiver 424, the repository query module 426, and the action executer module 428 may be partially, or entirely, implemented in hardware and/or in the processor 402. For example, the functionality may be implemented with an application specific integrated circuit, logic implemented in an embedded controller, or in logic implemented in the processor 402, among others. In some embodiments, the functionalities of the receiver module 424, repository query module 426, and action executer module 428 can be implemented with logic, wherein the logic, as referred to herein, can include any suitable hardware (e.g., a processor, among others), software (e.g., an application, among others), firmware, or any suitable combination of hardware, software, and firmware.

Figure 5:
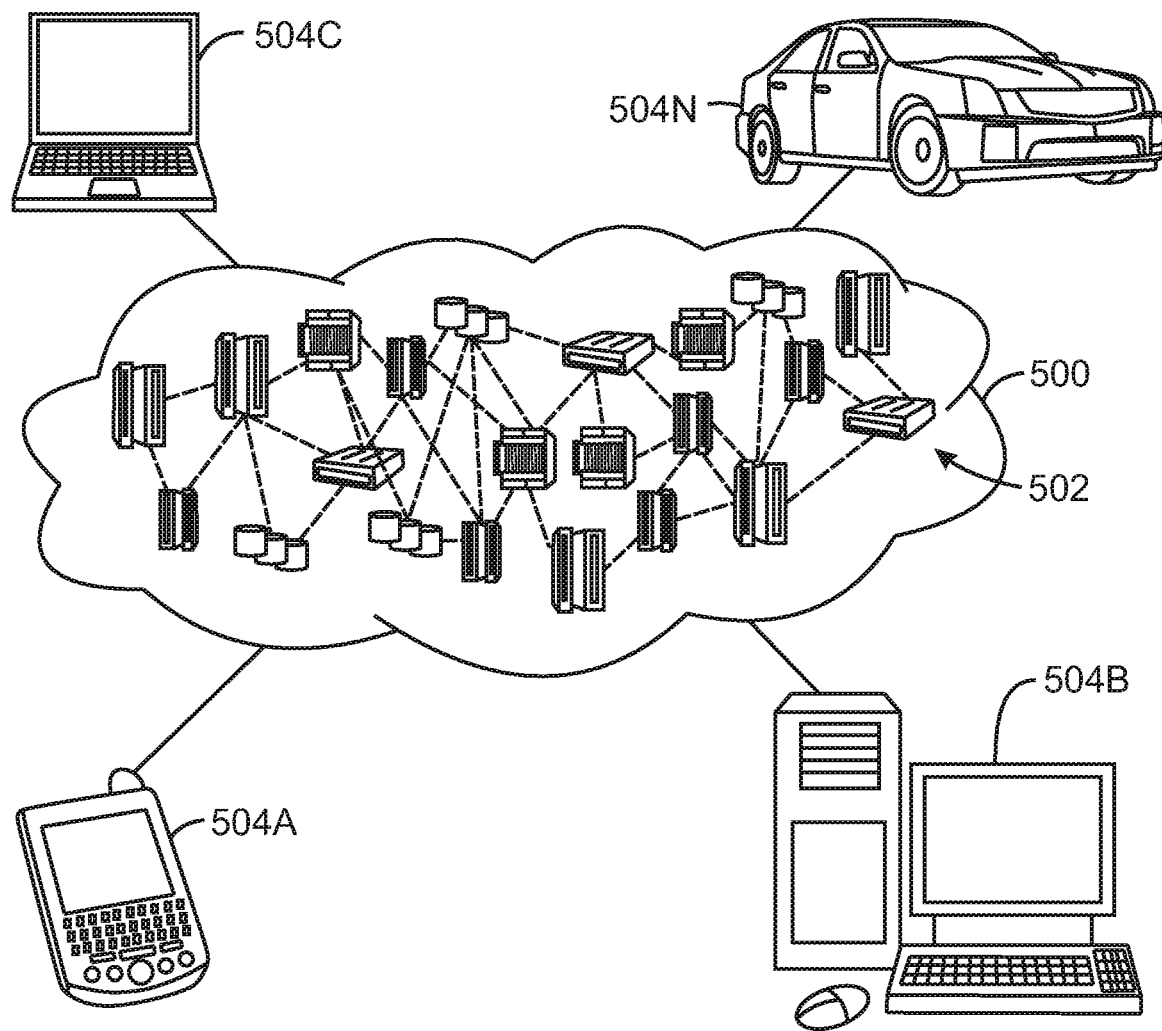
FIG. 5 is a process flow diagram of an example cloud computing environment according to embodiments described herein.

Referring now to FIG. 5, illustrative cloud computing environment 500 is depicted. As shown, cloud computing environment 500 comprises one or more cloud computing nodes 502 with which local computing devices used by cloud consumers, such as, for example, personal digital assistant (PDA) or cellular telephone 504A, desktop computer 504B, laptop computer 504C, and/or automobile computer system 504N may communicate. Nodes 502 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 504A-N shown in FIG. 5 are intended to be illustrative only and that computing nodes 502 and cloud computing environment 500 can communicate with any type of computerized device over any type of network and/or network addressable connection (e.g., using a web browser).

Figure 6:
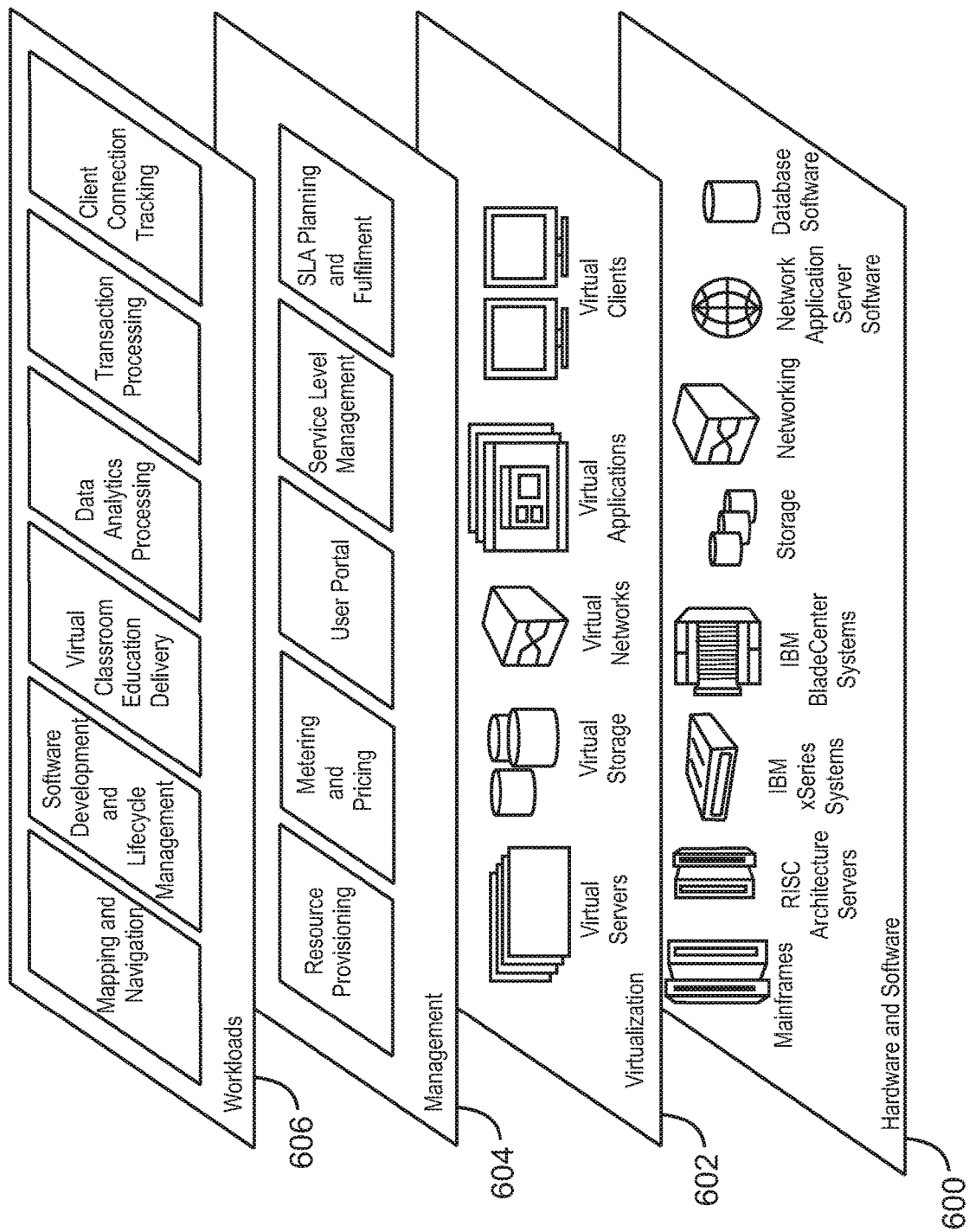
FIG. 6 is a process flow diagram of an example abstraction model layers according to embodiments described herein.

Referring now to FIG. 6, a set of functional abstraction layers provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided.

Hardware and software layer 600 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 602 provides an abstraction layer from which the following examples of virtual entities may be provided: virtual servers; virtual storage; virtual networks, including virtual private networks; virtual applications and operating systems; and virtual clients. In one example, management layer 604 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 606 provides examples of functionality for which the cloud computing environment may be utilized. Examples of workloads and functions which may be provided from this layer include: mapping and navigation; software development and lifecycle management; virtual classroom education delivery; data analytics processing; transaction processing; and client connection tracking.

The present techniques may be a system, a method or computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present techniques may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present techniques.

Aspects of the present techniques are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 7:
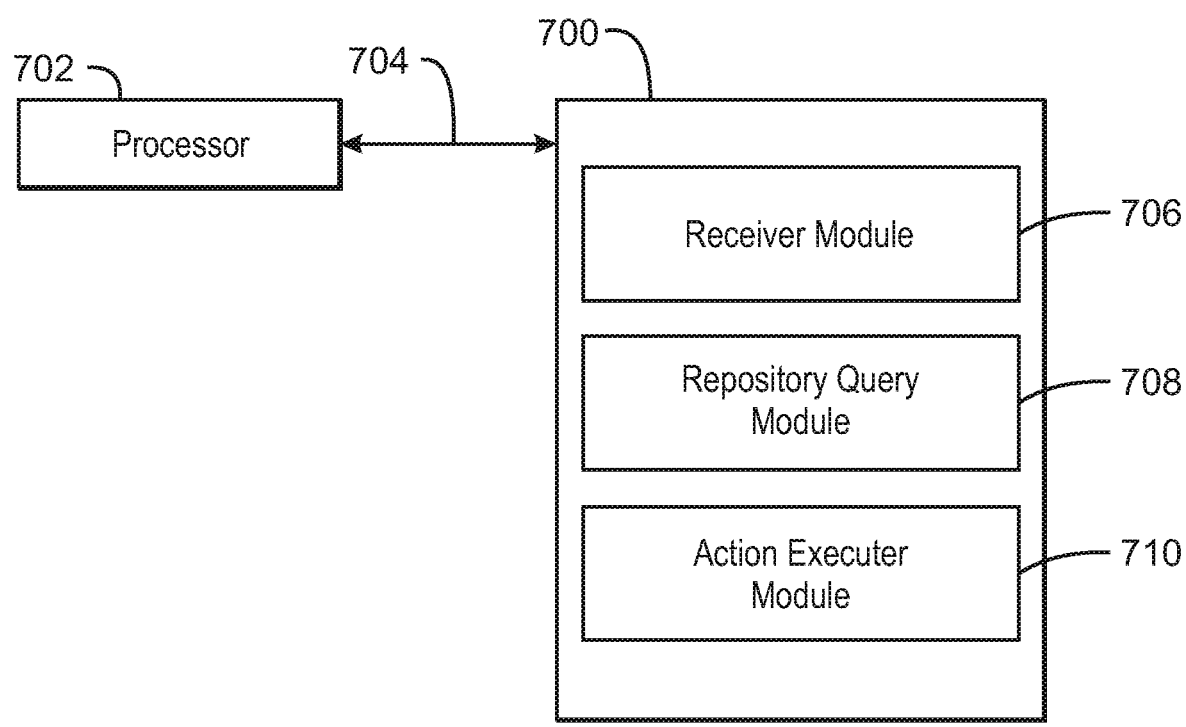
FIG. 7 is an example tangible, non-transitory computer-readable medium that can track client sessions in a publish and subscribe system using a shared repository.

Referring now to FIG. 7, a block diagram is depicted of an example tangible, non-transitory computer-readable medium 700 that can track client sessions in a publish and subscribe system using a shared repository. The tangible, non-transitory, computer-readable medium 700 may be accessed by a processor 702 over a computer interconnect 704.

Furthermore, the tangible, non-transitory, computer-readable medium 700 may include code to direct the processor 702 to perform the operations of the method 300 of FIG. 3 above.

The various software components discussed herein may be stored on the tangible, non-transitory, computer-readable medium 700, as indicated in FIG. 7. For example, a receiver module 706 includes code to receive a connection request with a client identifier from a client and a predefined policy for duplicate client sessions. A repository query module 708 includes code to query a shared repository of the publish and subscribe system using the client identifier. An action executer module 710 includes code to track client sessions based on the predefined policy, a query result including a detected duplicate client session from the shared repository, and a set of parameters. In some examples, the set of parameter can include a property of the client, a history of connection attempts by the client or other clients, a history of resolutions of previously detected duplicate client sessions, a status of a plurality of servers of the system, among other parameters. In various examples, tracking the client sessions can include performing a set of actions. The action executer module 710 also includes code to connect the client and update a client status table with the client identifier in response to detecting that the query result does not indicate any duplicate client session. In various examples, the action executer module 710 also includes code to resolve a duplicate client session locally and update the client status table based on the action taken to resolve the duplicate client in response to detecting that the query result indicates the duplicate client session within the server. In some examples, the action executer module 710 also includes code to read a record corresponding to a server ID of a second server in a server status table and resolve the detected duplicate client session in response to detecting that the query result indicates a duplicate client session within a second server. In various examples, the action executer module 710 also includes code to connect the client and update a client status table with the client identifier in response to detecting no record in the server status table or that the record indicates a suspended or down status, wherein the action is to be executed in response to detecting that the query result indicates a duplicate client session within a second server. In various examples, the action executer module 710 includes code to ignore the duplicate client session, updating a client status table, and connecting the client in response to detecting the record indicates an active status. In some examples, the action executer module 710 includes code to send a request to the second server to disconnect the client, select a timeout, periodically read the client status table and the server status table, in response to detecting the record indicates an active status. For example, the action executer module 710 includes code to connect the client in response to detecting that the client status table no longer has a record for the client ID or a connect status of disconnected, the server status table does not have a record corresponding to the server ID or contains a status of suspended or down, or that the timeout has expired. In various examples, the action executer module 710 includes code to send a request to the second server to disconnect the client, select a timeout, and periodically read the client status table and the server status table, in response to detecting the record indicates an active status. In this example, the action executer module 710 includes code to connect the client in response to detecting that the client status table no longer has a record for the client ID or a connect status of disconnected, or that the server status table does not have a record corresponding to the server ID or contains a status of suspended or down, the processor to fail the connection request in response to detecting that the timeout has expired. In some examples, the action executer module 710 includes code to dynamically select the timeout based on a configuration, information corresponding to the client in the repository, a history of client connect requests and client disconnect events, or any combination thereof. It is to be understood that any number of additional software components not shown in FIG. 7 may be included within the tangible, non-transitory, computer-readable medium 700, depending on the particular application.

The flowchart and block diagrams in the Figures illustrate the architecture, functionality, and operation of possible implementations of systems, methods, and computer program products according to various embodiments of the present techniques. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. It is to be understood that any number of additional software components not shown in FIG. 7 may be included within the tangible, non-transitory, computer-readable medium 700, depending on the specific application.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising a processor of a server to:
   receive a connection request with a client identifier associated with a client device and a predefined policy for duplicate client sessions within a distributed publish and message broker comprising a plurality of decoupled servers coupled to a shared repository, wherein the plurality of decoupled servers comprises the server and the client device is connected to the server of the plurality of decoupled servers based on a load balancing scheme;
   query the shared repository of the system coupled to the plurality of decoupled servers using the client identifier to detect a risk of a duplicate client session in response to detecting that a client identifier in the shared repository matches the client identifier from the client device and a connected status that indicates that the client identifier is currently being used to connect to one of the plurality of decoupled servers, wherein the shared repository comprises a client status table comprising a list of client IDs with corresponding connection statuses and a server status table comprising a list of the plurality of decoupled servers with associated status codes; and
   execute a set of actions based on the predefined policy, the detected risk of the duplicate client session from the shared repository, and a set of parameters.

2. The system of claim 1, wherein the set of parameters comprises a history of connection attempts by other clients and a history of resolutions of previously detected duplicate client sessions.

3. The system of claim 1, wherein the query result indicates that the duplicate client session is within a second server and the set of actions comprises reading a record corresponding to a server ID of the second server in the server status table and resolving the detected duplicate client session.

4. The system of claim 3, wherein the set of actions further comprises, in response to detecting the record corresponding to the server ID of the second server in the server status table indicates an active status, ignoring the detected duplicate client session, updating the client status table, and connecting the client.

5. The system of claim 3, wherein the set of actions further comprises, in response to detecting the record corresponding to the server ID of the second server in the server status table indicates an active status, sending a request to the second server to disconnect the client, selecting a timeout, periodically read the client status table and the server status table, wherein, in response to detecting that the client status table no longer has a record for the client ID or a connect status of disconnected, the server status table does not have a record corresponding to the server ID or contains a status of suspended or down, or that the timeout has expired, the processor is to connect the client.

6. The system of claim 3, wherein the set of actions further comprises, in response to detecting the record corresponding to the server ID of the second server in the server status table indicates an active status, sending a request to the second server to disconnect the client, selecting a timeout, and periodically reading the client status table and the server status table, wherein the processor is to connect the client in response to detecting that the client status table no longer has a record for the client ID or a connect status of disconnected, or that the server status table does not have a record corresponding to the server ID or contains a status of suspended or down, and wherein the processor is to fail the connection request in response to detecting that the timeout has expired.

7. The system of claim 6, wherein the processor is to dynamically select the timeout based on information corresponding to the client in the repository.

8. A computer-implemented method, comprising:
   receiving, via a processor of a server, a connection request with a client identifier associated with a client device and a predefined policy for duplicate client sessions within a distributed publish and message broker comprising a plurality of decoupled servers and a shared repository, wherein the plurality of decoupled servers comprises the server and the client device is connected to the server of the plurality of decoupled servers based on a load balancing scheme;
   querying, via the processor, the shared repository of a system coupled to the plurality of decoupled servers using the client identifier to detect a risk of a duplicate client session in response to detecting that a client identifier in the shared repository matches the client identifier from the client device and a connected status that indicates that the client identifier is currently being used to connect to one of the plurality of decoupled servers, wherein the shared repository comprises a client status table comprising a list of client IDs with corresponding connection statuses and a server status table comprising a list of the plurality of decoupled servers with associated status codes; and executing, via the processor, a set of actions based on the predefined policy, the detected risk of the duplicate client session from the shared repository, and a set of parameters.

9. The computer-implemented method of claim 8, wherein the set of parameters comprises a property of the client and a history of connection attempts by the client.

10. The computer-implemented method of claim 8, wherein executing the set of actions comprises, in response to detecting that the query result indicates a duplicate client session within a second server, reading a record corresponding to a server ID of a second server in the server status table and resolving the detected duplicate client session.

11. The computer-implemented method of claim 10, wherein executing the set of actions comprises, in response to detecting the record corresponding to the server ID of the second server in the server status table indicates an active status, ignoring the duplicate client session, updating the client status table, and connecting the client.

12. The computer-implemented method of claim 10, wherein executing the set of actions comprises, in response to detecting the record corresponding to the server ID of the second server in the server status table indicates an active status, sending a request to the second server to disconnect the client, selecting a timeout, periodically reading the client status table and the server status table, wherein the processor is to connect the client in response to detecting that the client status table no longer has a record for the client ID or a connect status of disconnected, the server status table does not have a record corresponding to the server ID or contains a status of suspended or down, or that the timeout has expired.

13. The computer-implemented method of claim 10, wherein executing the set of actions comprises, in response to detecting the record corresponding to the server ID of the second server in the server status table indicates an active status, sending a request to the second server to disconnect the client, selecting a timeout, and periodically reading the client status table and the server status table, wherein the processor is to connect the client in response to detecting that the client status table no longer has a record for the client ID or a connect status of disconnected, or that the server status table does not have a record corresponding to the server ID or contains a status of suspended or down, and wherein the processor is to fail the connection request in response to detecting that the timeout has expired.

14. The computer-implemented method of claim 8, comprising training a machine learning mechanism to execute the actions based on the predefined policy and the set of parameters.

15. A computer program product for tracking client sessions in a publish and subscribe system, the computer program product comprising a computer-readable storage medium having program code embodied therewith, wherein the computer readable storage medium is not a transitory signal per se, the program code executable by a processor of a server to cause the processor to:

receive a connection request with a client identifier associated with a client device and a predefined policy for duplicate client sessions within a distributed publish and message broker comprising a plurality of decoupled servers and a shared repository, wherein the plurality of decoupled servers comprises the server and the client device is connected to the server of the plurality of decoupled servers based on a load balancing scheme;

query the shared repository of the publish and subscribe system coupled to the plurality of decoupled servers using the client identifier to detect a risk of a duplicate client session in response to detecting that a client identifier in the shared repository matches the client identifier from the client device and a connected status that indicates that the client identifier is currently being used to connect to one of the plurality of decoupled servers, wherein the shared repository comprises a client status table comprising a list of client IDs with corresponding connection statuses and a server status table comprising a list of the plurality of decoupled servers with associated status codes; and track client sessions based on the predefined policy, the detected risk of the duplicate client session from the shared repository, and a set of parameters.

16. The computer program product of claim 15, wherein the set of parameters comprises a status of a plurality of servers of the system.

17. The computer program product of claim 15, further comprising program code executable by the processor to read a record corresponding to a server ID of a second server in the server status table and resolve the detected duplicate client session in response to detecting that the query result indicates a duplicate client session within a second server.

18. The computer program product of claim 17, further comprising program code executable by the processor to, in response to detecting the record corresponding to the server ID of the second server in the server status table indicates an active status, ignore the duplicate client session, update the client status table, and connect the client.

19. The computer program product of claim 17, further comprising program code executable by the processor to, in response to detecting the record corresponding to the server ID of the second server in the server status table indicates an active status, send a request to the second server to disconnect the client, select a timeout, periodically read the client status table and the server status table, wherein the processor is to connect the client in response to detecting that the client status table no longer has a record for the client ID or a connect status of disconnected, the server status table does not have a record corresponding to the server ID or contains a status of suspended or down, or that the timeout has expired.

20. The computer program product of claim 19, further comprising program code executable by the processor to dynamically select the timeout based on a history of client connect requests and client disconnect events.

* * * * *